June 3, 1952 F. S. ENTZ ET AL 2,599,097

RADIOTELEPHONE STATION IDENTIFYING SYSTEM

Filed Dec. 30, 1948 10 Sheets-Sheet 1

INVENTORS F. S. ENTZ
R. O. SOFFEL
BY
ATTORNEY

INVENTORS F. S. ENTZ
R. O. SOFFEL
BY J W Schmied
ATTORNEY

RADIOTELEPHONE STATION IDENTIFYING SYSTEM

Filed Dec. 30, 1948 10 Sheets-Sheet 3

INVENTORS F. S. ENTZ
R. O. SOFFEL
BY J. W. Schmied
ATTORNEY

RADIOTELEPHONE STATION IDENTIFYING SYSTEM

Filed Dec. 30, 1948 10 Sheets-Sheet 4

INVENTORS F. S. ENTZ
R. O. SOFFEL
BY
J. W. Schmied
ATTORNEY

June 3, 1952 F. S. ENTZ ET AL 2,599,097

RADIOTELEPHONE STATION IDENTIFYING SYSTEM

Filed Dec. 30, 1948 10 Sheets-Sheet 5

INVENTORS F. S. ENTZ
R. O. SOFFEL
BY
J. W. Schmied
ATTORNEY

INVENTORS F. S. ENTZ
R. O. SOFFEL
BY
J. W. Schmied
ATTORNEY

INVENTORS F. S. ENTZ
R. O. SOFFEL
BY
J W Schmied
ATTORNEY

INVENTORS F. S. ENTZ
R. O. SOFFEL
BY
ATTORNEY

RADIOTELEPHONE STATION IDENTIFYING SYSTEM

Filed Dec. 30, 1948 10 Sheets-Sheet 9

INVENTORS F. S. ENTZ
R. O. SOFFEL
BY
J W Schmied
ATTORNEY

FIG. 11

| THOUSANDS DIGIT | HUNDREDS DIGIT 1 H1 | 2 H2 | 3 H3 | 4 H4 | 5 H5 | 6 H+5 H1 | 7 H+5 H2 | 8 H+5 H3 | 9 H+5 H4 | 0 H+5 H5 |
|---|---|---|---|---|---|---|---|---|---|---|
| 1 TH1 | 1 15 | 1 14 | 1 13 | 1 12 | 1 11 | 1 10 | 1 9 | 1 8 | 1 7 | 1 6 |
| 2 TH2 | 2 15 | 2 14 | 2 13 | 2 12 | 2 11 | 2 10 | 2 9 | 2 8 | 2 7 | 2 6 |
| 3 TH3 | 3 15 | 3 14 | 3 13 | 3 12 | 3 11 | 3 10 | 3 9 | 3 8 | 3 7 | 3 6 |
| 4 TH4 | 4 15 | 4 14 | 4 13 | 4 12 | 4 11 | 4 10 | 4 9 | 4 8 | 4 7 | 4 6 |
| 5 TH5 | 5 15 | 5 14 | 5 13 | 5 12 | 5 11 | 5 10 | 5 9 | 5 8 | 5 7 | 5 6 |
| 6 TH+5 TH1 | 6 15 | 6 14 | 6 13 | 6 12 | 6 11 | 6 10 | 6 9 | 6 8 | 6 7 | 2 1 |
| 7 TH+5 TH2 | 7 15 | 7 14 | 7 13 | 7 12 | 7 11 | 7 10 | 7 9 | 7 8 | 3 2 | 14 15 |
| 8 TH+5 TH3 | 8 15 | 8 14 | 8 13 | 8 12 | 8 11 | 8 10 | 8 9 | 3 4 | 13 14 | 13 15 |
| 9 TH+5 TH4 | 9 15 | 9 14 | 9 13 | 9 12 | 9 11 | 9 10 | 5 4 | 12 13 | 12 14 | 12 15 |
| 0 TH+5 TH5 | 10 15 | 10 14 | 10 13 | 10 12 | 10 11 | 3 5 | 11 12 | 11 13 | 11 14 | 11 15 |

FIG. 12

| | F15 | F14 | F13 | F12 | F11 | F10 | F9 | F8 | F7 | F6 | F5 | F4 | F3 | F2 |
|---|---|---|---|---|---|---|---|---|---|---|---|---|---|---|
| F1 | 11 | 12 | 13 | 14 | 15 | 16 | 17 | 18 | 19 | 10 | X | X | X | 60 |
| F2 | 21 | 22 | 23 | 24 | 25 | 26 | 27 | 28 | 29 | 20 | X | X | 79 | |
| F3 | 31 | 32 | 33 | 34 | 35 | 36 | 37 | 38 | 39 | 30 | 06 | 88 | | |
| F4 | 41 | 42 | 43 | 44 | 45 | 46 | 47 | 48 | 49 | 40 | 97 | | | |
| F5 | 51 | 52 | 53 | 54 | 55 | 56 | 57 | 58 | 59 | 50 | | | | |
| F6 | 61 | 62 | 63 | 64 | 65 | 66 | 67 | 68 | 69 | | | | | |
| F7 | 71 | 72 | 73 | 74 | 75 | 76 | 77 | 78 | | | | | | |
| F8 | 81 | 82 | 83 | 84 | 85 | 86 | 87 | | | | | | | |
| F9 | 91 | 92 | 93 | 94 | 95 | 96 | | | | | | | | |
| F10 | 01 | 02 | 03 | 04 | 05 | | | | | | | | | |
| F11 | 00 | 09 | 08 | 07 | | | | | | | | | | |
| F12 | 90 | 99 | 98 | | | | | | | | | | | |
| F13 | 80 | 89 | | | | | | | | | | | | |
| F14 | 70 | | | | | | | | | | | | | |

INVENTORS F. S. ENTZ
R. O. SOFFEL
BY J W Schmied
ATTORNEY

Patented June 3, 1952

2,599,097

UNITED STATES PATENT OFFICE 2,599,097

RADIOTELEPHONE STATION IDENTIFYING SYSTEM

Ferdinand S. Entz, Mount Kisco, and Robert O. Soffel, Hastings on Hudson, N. Y., assignors to Bell Telephone Laboratories, Incorporated, New York, N. Y., a corporation of New York Application December 30, 1948, Serial No. 68,348

17 Claims. (Cl. 179—84)

This invention relates to telephone systems and especially to the selective signaling of one of a plurality of mobile stations from a fixed land station where it is required to receive positive identification of a mobile unit, both on incoming and outgoing calls. The selective signaling is accomplished by a simultaneous transmission of a combination of four audio frequencies, each station being assigned an exclusive combination, as described in copending applications of H. C. Harrison, Serial No. 767,487, filed August 8, 1947, and D. F. Hoth-R. O. Soffel, Serial No. 56,186, filed October 23, 1948. This invention relates specifically to means for identifying any mobile station.

An object of the invention is to provide a system in which any one or more of a large number of outlying stations interconnected by a common transmission medium may be selectively signaled from a calling station, and an identifying signal automatically returned to the calling station to indicate that the called station, or stations, has been signaled.

Another object of the invention is to register at the outlying called station, or stations, a positive indication that a calling signal has been received thereat, even though the outlying stations may be unattended when the call is received.

Still another object of the invention is to provide positive identification at a central office station of any outlying party line station which may originate a call.

Although the invention may be employed in any communication or signaling system, the preferred embodiment in which the invention is here illustrated is a mobile radio telephone system.

As specifically applied to the preferred embodiment of the invention in a mobile radio telephone system, one of the objects is to provide a selective signaling system which will return a positive indication to the fixed land station that the called subscriber's mobile station has been signaled even though the mobile subscriber is not in attendance at the time. Such an automatic return indication, which has not been available in mobile telephone systems heretofore, is highly desirable in this type of system for informing the central office operator when the calling signal may be removed from the land station transmitter. The necessary period during which the calling signal must be applied to the land station transmitter may vary for each call depending upon whether the mobile station may be passing through an underpass or steel bridge or between steel reinforced buildings which may effectively shield the mobile station from receiving the calling signal during a portion of the calling period. Obviously, it is desirable to remove the calling signal from the land transmitter as soon as the mobile station has been signaled in order that conversation may be commenced without unnecessary delay.

Such positive indication at the central office that the called mobile subscriber's station has been signaled is especially desirable in the matter of calling a mobile subscriber who is traveling along a highway between distant urban areas, as in this case the operator generally has to attempt the call through a number of different transmitting stations successively until a transmitter is located which is within signaling range of the mobile station. As the mobile subscriber may have stopped and temporarily left his car or truck at any point along his route of travel just at a time when his mobile station is called, the mobile service operator heretofore has had no means of knowing when the car was signaled and under such circumstances she has continued to search by applying the calling signal to successive transmitters along the route. With the present invention, such prolonged searching for a mobile station is avoided since the invention provides a positive return indication to the central office that the mobile station has been reached and signaled even though no one is in attendance at the mobile station when the signal is there received. By providing a signal lamp, or other suitable indicator, together with a lock-up arrangement at the mobile station, the subscriber is given an indication that his station was called during his absence. The use of a gas discharge lamp or other device of low power consumption provides this indication at the mobile station during prolonged periods of unattendance without imposing excessive drain upon the mobile station battery.

Another object of the invention as adapted to the preferred embodiment is to provide at the central office or fixed land station a positive identification of any mobile station originating a call. This is of considerable importance to the telephone company providing mobile radio service since identification in such cases is necessary for proper billing of the toll charges which may be involved. Heretofore, the mobile service operator has had to ask the mobile subscriber who originated a call to identify himself or the station from which he was calling, as there has been no other way of determining which one of a large number of mobile radio stations adapted to operate on the same radio frequency channel may be in operation at any given time. With the present invention such verbal identification is no longer necessary as the invention provides means whereby each mobile station upon being put into operation by or on behalf of a subscriber originating a call, automatically transmits a station identifying signal which may be received and positively identified at the central office.

An understanding of the circuit arrangements contemplated by the invention, and better appreciation of the various features and advantages thereof, is to be gained from a study of the accompanying drawings illustrating a preferred embodiment in which.

Figure 13:
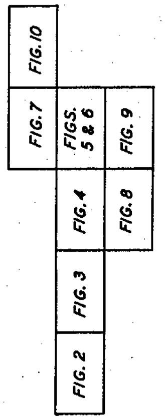
Figure 8:
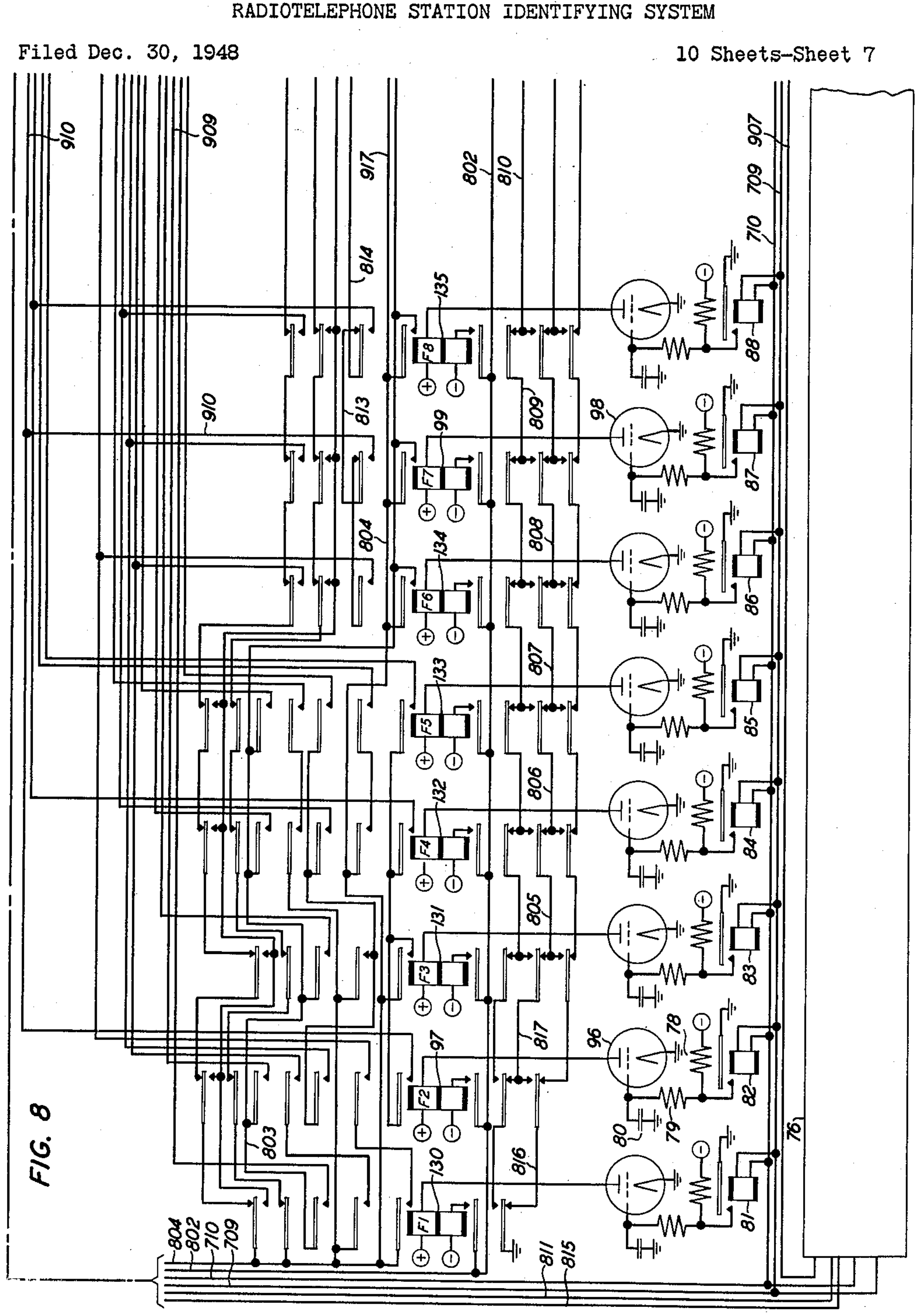
Figure 9:
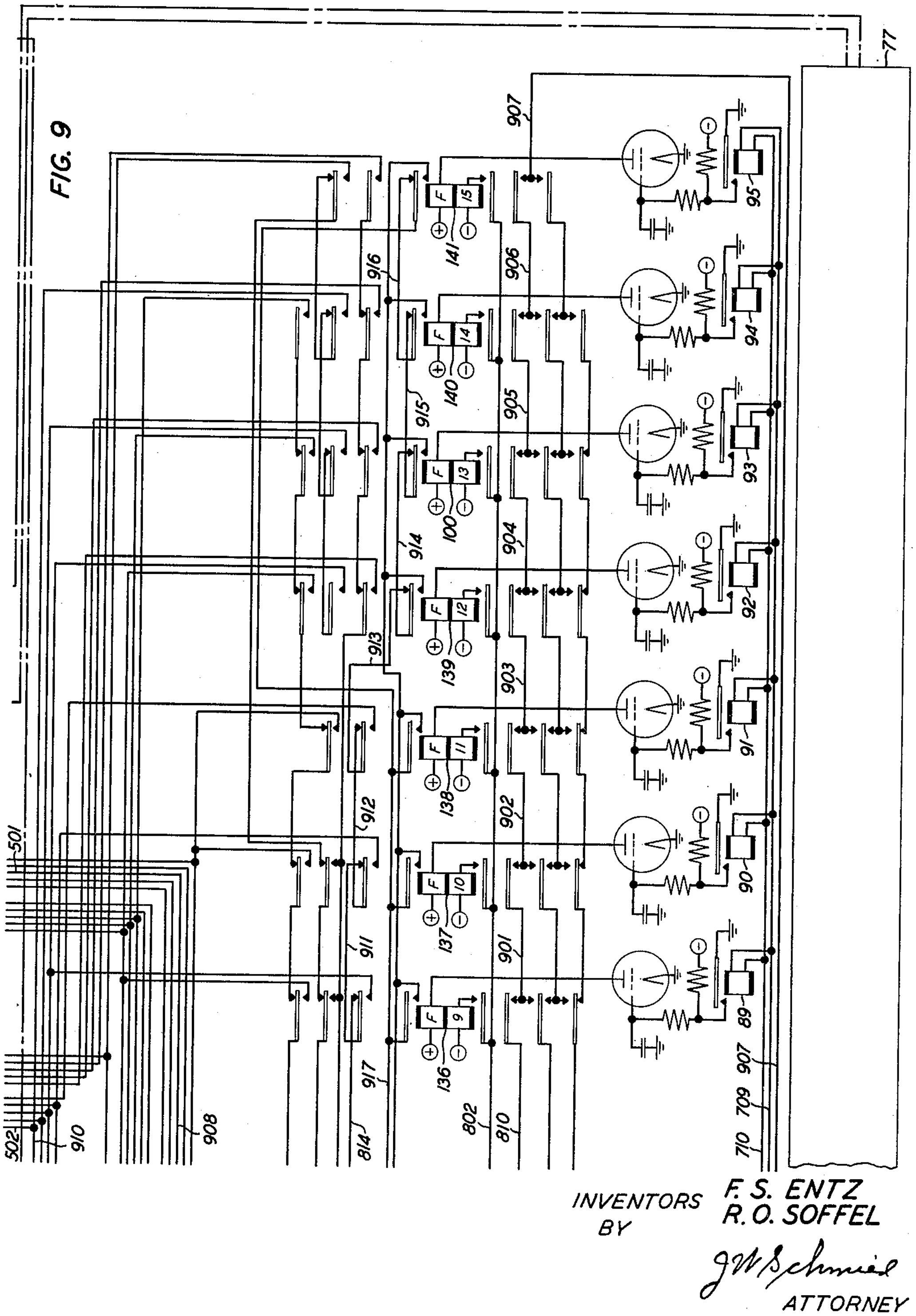
Figure 10:
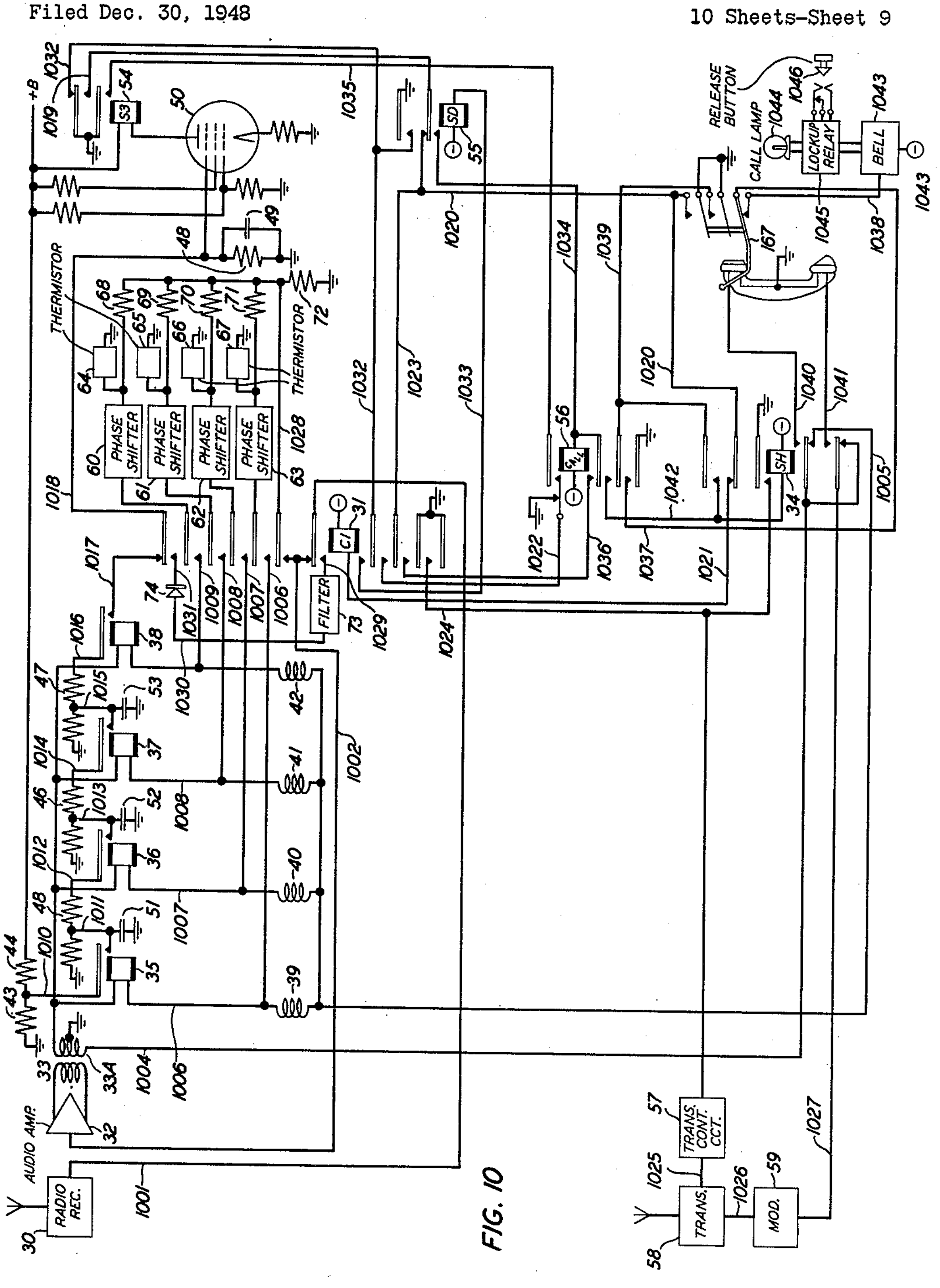

Figs. 8 and 9 taken together illustrate a multifrequency translator for converting a plurality of simultaneously received signal currents of different frequencies into their corresponding decimal code equivalent;

Fig. 10 illustrates a circuit for switching arrangements at a mobile radio telephone station adapted for two-way communication in the system of the invention;

Fig. 11 illustrates, in tabular form, one arrangement of signal frequency assignments for the first two digits of a four out of thirty frequency translation, as may be employed in the preferred embodiment of applicants' invention;

Fig. 12 shows the equivalent two-digit decimal numbers corresponding to any combination of two out of fifteen frequencies when selected in accordance with the table of Fig. 11; and Fig. 13 shows a plan according to which the several sheets of drawings, Fig. 2 through Fig. 10, should be arranged in order properly to trace applicants' circuit continuity.

Figure 1:
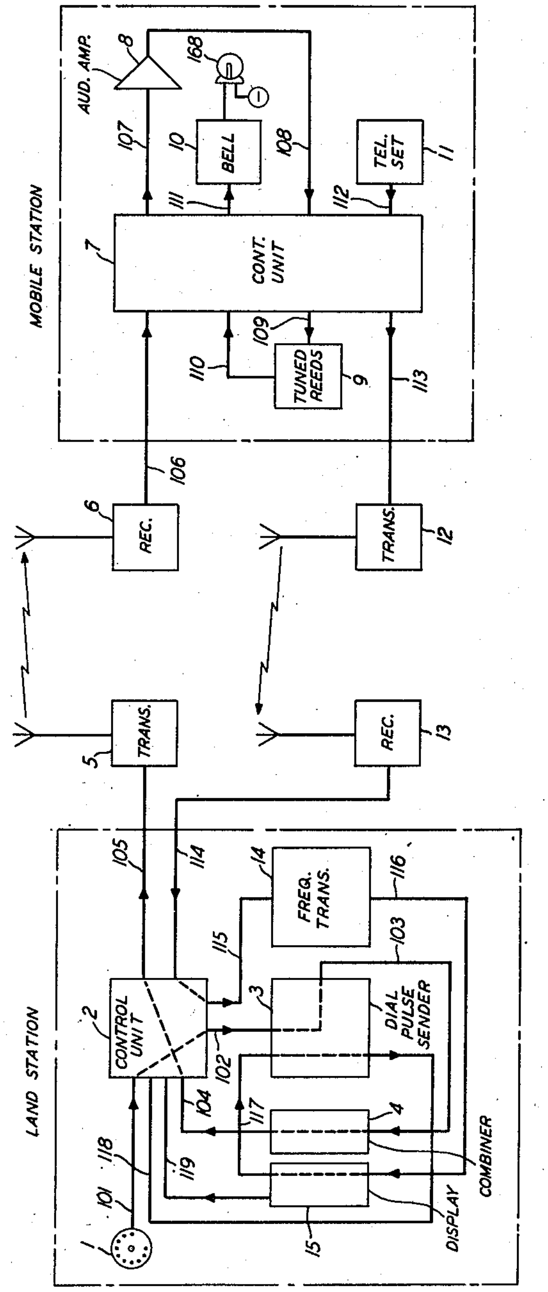
Fig. 1 shows by block diagram the relationships between the principal components of a complete mobile radio system.

The general operation of the invention will first be explained in terms of the block diagram shown in Fig. 1. The identification of a mobile station which is signaled by a call originating from the land station will first be described. Referring to Fig. 1, which is a block diagram representing a land station and one mobile station, the call is originated by connecting the dial 1 to the control unit 2. Pulses from dial 1 are transmitted over lead group 101 through equipment in the control unit, and over lead group 102 to the dial pulse sender shown in block number 3. The pulses are counted for each digit and recorded in a register circuit included within the dial pulse sender. Contacts on the register relays convert the four-digit decimal number into a combination of four out of thirty audio frequencies in the manner disclosed by aforesaid copending application of Hoth-Soffel Serial No. 56,186. These frequencies are transmitted over lead group 103 to the combiner circuit No. 4 where they are amplified and combined through hybrid coils from whence they are transmitted over lead group 104 through equipment in the control unit 2 over lead group 105 to radio transmitter 5 where they are used to modulate the carrier frequency.

The transmitter radiates the aforementioned combination of audio frequencies and they are received by the mobile station radio receiver shown in block 6. The receiver detects the four audio frequencies, transmits them over lead group 106 through equipment in the control unit 7 and over lead group 107 to the audio amplifier 8. The output of the audio amplifier is transmitted over lead group 108 through equipment in the control unit, thence over lead group 109 to a set of four wave filters 9. In this preferred embodiment of the invention these filters consist of mechanically tuned vibrating reeds equipped with contacts which close momentarily when the associated reed is excited by its tuned frequency. The contacts of the four reed vibrators are connected in series to lead 110. Lead 110 is connected to a detecting device in the control unit which operates when all four reeds are excited by their resonant frequencies. The detecting device, when energized, operates equipment in the control unit which accomplishes the following:

*a.* Disconnects the input of the audio amplifier from the radio receiver.

*b.* Connects the reeds in a multiple bridge circuit to the input of the audio amplifier thus producing an oscillator having an output consisting of four frequencies, one for each of the reed resonant frequencies.

*c.* Connects the output of this oscillator over lead group 113 to radio transmitter 12 where it is used to modulate the transmitter carrier at the mobile station.

*d.* Conditions the mobile station to subsequently respond to ringing tone.

This modulated carrier is received and demodulated by radio receiver 13 at the land station and the four audio frequencies thus obtained are transmitted over lead group 114 through the control unit 2, over lead group 115 to the frequency translator 14. Here the combination of four frequencies is translated into a four-digit decimal number. This information is transmitted over lead groups 116 and 117 to a series of check contacts on the register relays in the dial pulse sender. If the number obtained from the frequency translator agrees with the number stored in the register a check signal is sent over lead 118 to the control unit 2 where it operates equipment which removes the four audio frequencies now connected to the transmitter and substitutes for them a distinctive check tone. This check tone modulates the land station transmitter carrier. The mobile station radio receiver 6 receives this modulated carrier, demodulates it and applies the check tone over lead group 106 to the control unit where it operates equipment which operates the bell 10 and signal lamp 168 over lead 111.

When the mobile subscriber removes his handset from the switchhook the control unit:

*a.* Removes the audio amplifier from the oscillator condition.

*b.* Connects the audio amplifier between the output of the receiver and the mobile subscriber's telephone.

*c.* Connects the radio transmitter to the mobile subscriber's microphone.

The removal of the four audio frequencies from the mobile station transmitter causes the equipment in the land station to go into the talking condition.

The identification of the mobile station in the case of a mobile originating call will now be briefly described. When the mobile subscriber removes his handset from the switchhook a signal is sent to the control unit 7 which connects the selector reeds in the oscillator circuit previously described. The output of this oscillator is connected to the mobile transmitter 12 where it modulates the carrier frequency.

The modulated carrier is received by the land station receiver 13, demodulated, and four audio frequencies transmitted over lead group 114 to the control unit 2 where they are connected over lead 115 to the frequency translator. As previously described the frequency translator converts the four frequencies into a four-digit decimal number. This number is connected over lead group 116 to the display circuit 15 which consists of a plurality of lamps arranged to display the number visually. The frequency translator also signals the control unit that it has received exactly four frequencies. This causes the line lamp to light as an indication to the operator that a mobile station call has been originated. It also operates equipment in the control unit 2 which causes a check tone to be connected over lead group 105 to the radio transmitter where it is used to modulate the carrier.

The mobile receiver 6 receives and demodulates this signal, applies the check tone over lead group 106 to the control unit 7, where equipment is operated which causes the mobile station to go into the talking condition. The land station operator operates her talk key, the identification equipment in the land station is released and the call has been established.

In the above description the number of the calling station was displayed visually. It will be understood that instead of a visual display this information could be used to operate a register for use in an automatic message accounting system, if desired.

A detailed description of the preferred embodiment of this invention will now be given for the case of a call originating at a land station.

Figure 7:
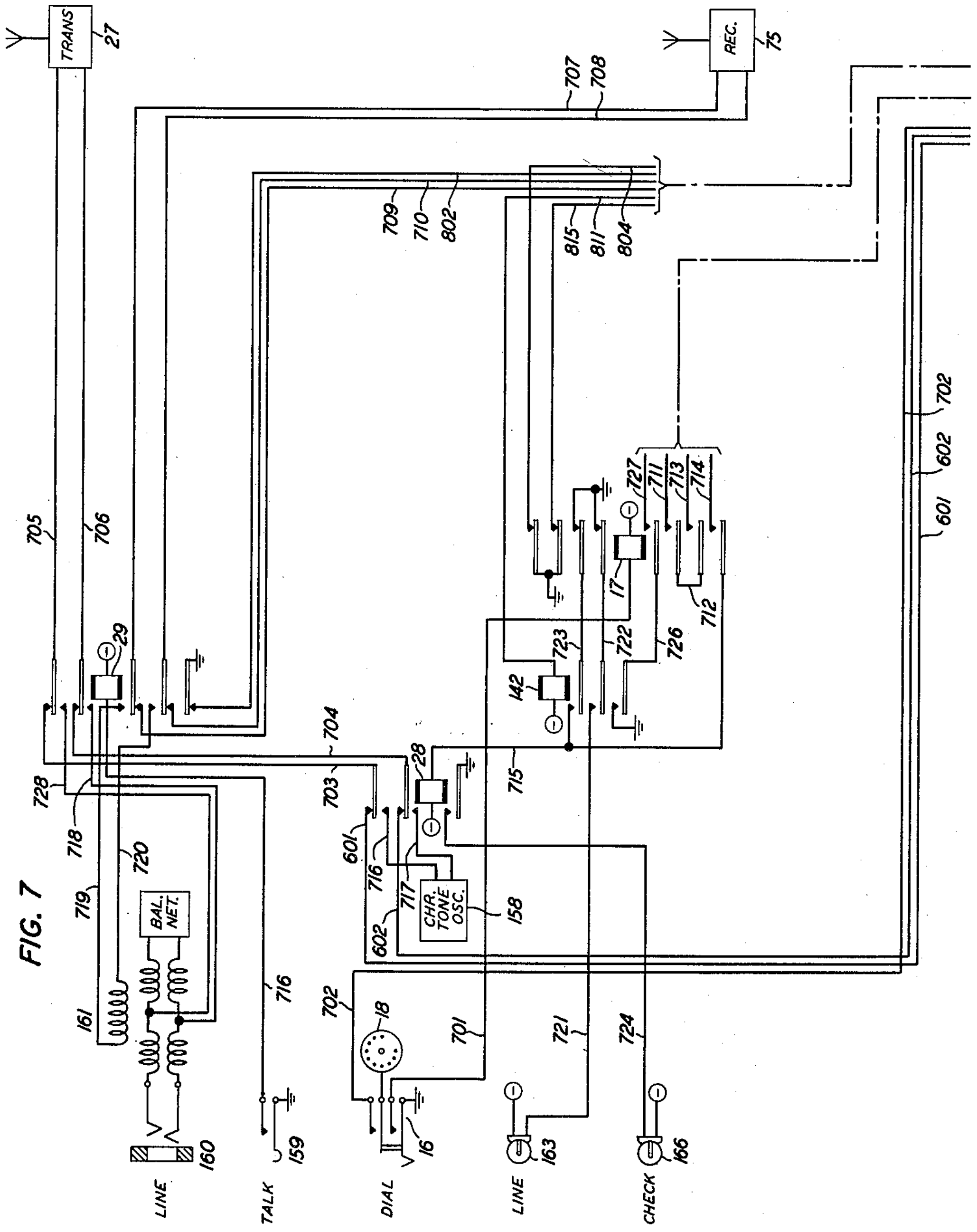
Fig. 7 illustrates switching control arrangements at a central office or land station control terminal.

Referring to Fig. 7, when the operator desires to originate a call, she operates dial key 16. The operation of key 16 connects ground over lead 701 to operate relay 17. The operation of key 16 also connects the dial 18 over lead 702 to operate relay 163 in Fig. 2. Operation of relay 17 performs no function at this time. The operation of relay 163 connects ground to lead 201, which operates the slow release relay 19 which in turn provides off-normal grounds to permit the pulse counting register relays to function. The pulses generated by dial 18 in Fig. 7 are transmitted over lead 702 to relay 163 in Fig. 2 which repeats the dial pulses. These repeated pulses are counted in a well-known manner by the relays in Fig. 2 and connected through the relays in Fig. 3 to operate the particular register relays in Fig. 4 corresponding to the numbers dialed. A detailed description of this counting and registering operation is given in aforementioned copending application Serial No. 56,186. In addition to the translating contacts on the register relays in Fig. 4 which convert the four digit decimal number into a combination of four audio frequencies, a set of contacts is provided to indicate which relays are operated in the register. These contacts are used to compare the four-digit decimal number produced by the frequency translator of Figs. 8 and 9 with the number originally dialed and to indicate if the two numbers are the same.

Figure 4:
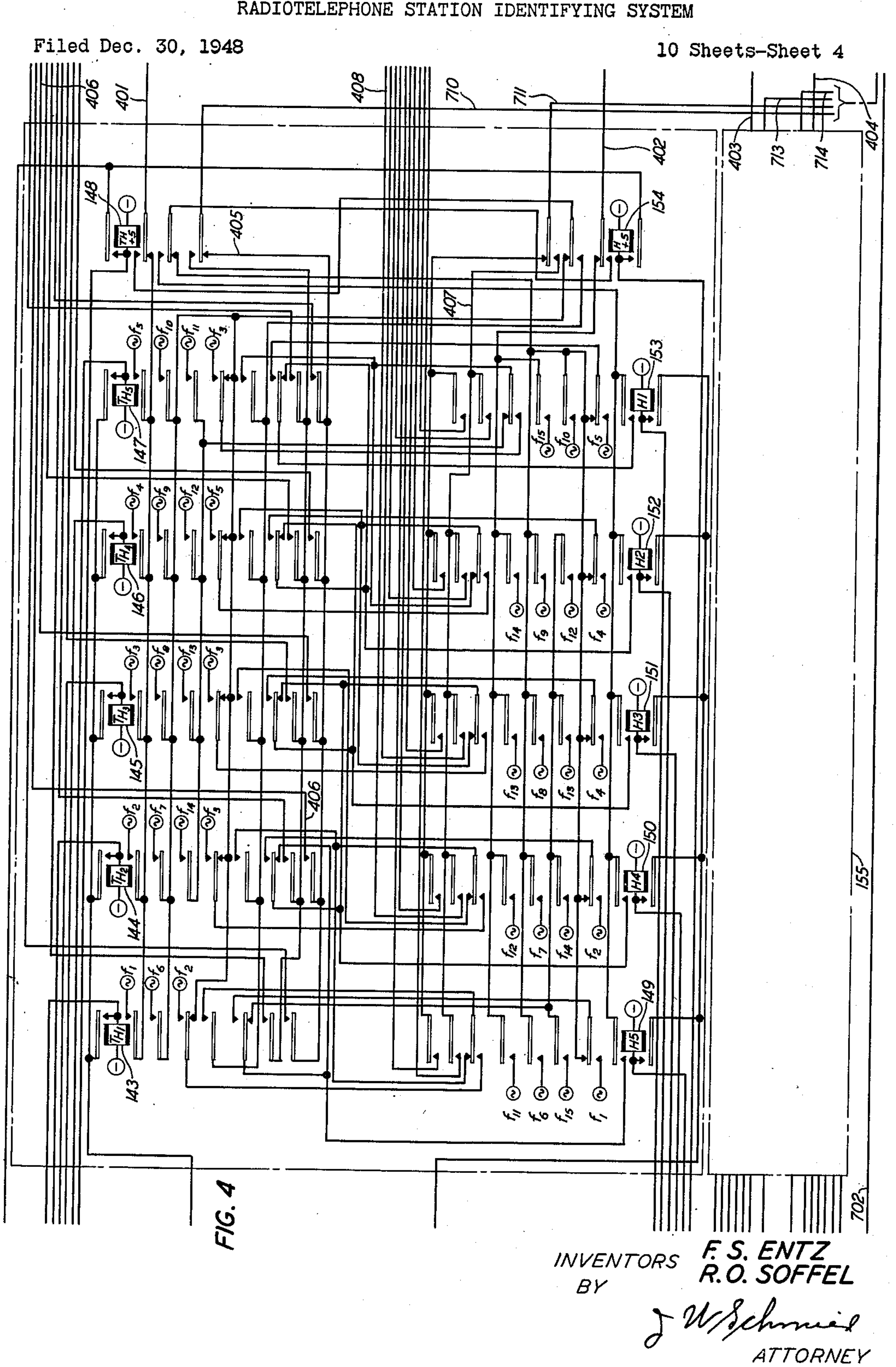
Fig. 4 illustrates a combined register and translator circuit in which dialed digits of a call number are stored and translated into a select plurality of different frequency signal currents.

When the operator has completed dialing four digits, leads 401, 402, 403 and 404 will each be connected through the translating contacts of the relays in Fig. 4 to a distinctive frequency. Leads 401 to 404 are connected to amplifiers 20 to 23, respectively, in Fig. 6. The outputs of these amplifiers are combined through hybrid coils 24, 25, 26. The combined output of hybrid coil 26 is connected over leads 601 and 602 to contacts of relay 28 in Fig. 7, from thence over leads 703 and 704 and through contacts of relay 29 to leads 705 and 706 which are connected to the radio transmitter 27. The combination of four tones is used to modulate the carrier frequency of the radio transmitter. This modulated carrier is received by the mobile station radio receiver 30 in Fig. 10. The demodulated output of receiver 30 is connected over lead 1001 through a normally closed contact on relay 31 to lead 1002 which is connected to the input of the audio amplifier 32. The output of the audio amplifier connects to output transformer 33. Lead 1003 from the output transformer is connected to one side of the windings of relays 35 to 38, respectively. These relays are of the tuned reed type described in copending applications of H. C. Harrison, Serial No. 767,487, filed August 8, 1947, and Serial Nos. 776,251, now Patent No. 2,499,581, granted March 7, 1950, and 776,252, filed September 26, 1947, now abandoned. The other side of the output winding of transformer 33 is connected over 1004 through a normally made contact on relay 34 and over lead 1005 to one side of the windings of coils 39 to 42, respectively. The other side of the winding of each coil is connected to the driving coil of its associated relay over leads 1006 to 1009, respectively. When these relays 35 to 38 respectively, are energized at their resonant frequencies, their vibrating contacts close intermittently. A positive potential on the voltage divider consisting of resistances 43 and 44 is connected over lead 1010 through the vibrating contacts of relay 35, lead 1011, through resistance 48, lead 1012, through the vibrating contacts of relay 36, lead 1013, through resistance 46, lead 1014, through the vibrating contact of relay 37, lead 1015, through resistance 47, lead 1016, through the vibrating contacts of relay 38 to lead 1017 which is connected through a normally closed contact on relay 31 over lead 1018 to a grid of vacuum tube 50. Condensers 49, 51, 52 and 53 are used to bridge over the open periods of the vibrating contacts, maintaining positive potential along the circuit during the intervals when the vibrating contacts are open. When the charge on condenser 49 has become sufficiently positive, plate current is caused to flow in vacuum tube 50 causing relay 54 to operate.

The operation of relay 54 connects ground to lead 1019 through a normally made contact on relay 55 to lead 1020 through a normally made contact of relay 34 over lead 1021 to operate relay 31. The operation of relay 31 connects ground from a normally made contact of a make-before-break spring combination on relay 56 over lead 1022 to lead 1023 to lead 1020 which holds relay 31 operated under control of relay 56. The operation of relay 31 connects ground over lead 1024 to the transmitter control circuit 57 which turns on the radio transmitter 58.

Winding 33A of the output transformer which is grounded at its center tap forms half of a bridge circuit. The other half of the bridge comprises the four parallel circuits each comprising a tuned reed relay in series with a balancing coil having an impedance of such a value that it balances the impedance of the reed relay driving coil at all frequencies except the resonant frequency of the reed. When the resonant frequency of a reed is applied to the bridge, the reed vibrates and its motional impedance is reflected by the relay coil thereby unbalancing the bridge. For example, if the resonant frequency of relay 35 is applied to the bridge circuit in combination with several other frequencies the resonant frequency of relay 35 will appear on lead 1006 and all other frequencies will be greatly attenuated. If a bridge of this type is inserted in the feedback path of an amplifier having sufficient gain to overcome the mid-band loss of the bridge, a condition for producing oscillations at the reed frequency will be obtained. This operation is described more fully in copending application of A. E. Bachelet, Serial No. 22,820, filed April 23, 1948, now Patent No. 2,541,320, granted February 13, 1951. In the preferred embodiment of the present invention there are four balanced reed circuits connected in parallel, each having an independent output.

The operation of relay 31 connects lead 1006 through phase shifter 63 and limiting resistance 71 to mixing resistance 72. The amplitude of this wave is limited by thermistor 67. Similarly, leads 1007 to 1009 respectively, are connected through operated contacts of relay 31, thence through phase shifters 62, 61 and 60, respectively, and limiting resistors 70, 69 and 68, respectively, thence through the mixing resistance 72 to ground. The voltage developed across resistance 72 is transmitted over lead 1028, through an operated contact of relay 31, over lead 1002 to the input of the audio amplifier 32. Operation of relay 31 also removes the output of the radio receiver 30 from the audio amplifier 32. The above-described combination provides four oscillators having a common amplifier. Since the vibrating reeds 35 to 38 are adjusted to provide maximum response at each resonant frequency, and since the frequency at which the phase shift is 180 degrees is not necessarily the frequency which produces maximum response, the phase shifters 60 to 63 are introduced in order to permit trimming the oscillator frequency so that the frequency produced under this condition coincides with the frequency of maximum response. The output of the above-described oscillator which comprises the combination of four frequencies, is applied over lead 1004 through a normally closed contact of relay 34 over lead 1027 to the mobile station modulator 59 which serves to modulate the carrier frequency of the radio transmitter 58. The modulated carrier is applied to the transmitter over lead 1026. The operation of relay 31 also transferred the output of the radio receiver from lead 1002 to lead 1029. Lead 1029 is applied to the input of wave filter 73, the output of which filter is connected over lead 1030 through rectifier 74, lead 1031, through an operated contact of relay 31 and lead 1018 to a grid of vacuum tube 50.

The modulated carrier is received by the land station receiver 75 in Fig. 7. The demodulated output of this receiver, comprising the four tones generated by the mobile station equipment, is connected over leads 707 and 708 through normally closed contacts of relay 29 over leads 709 and 710 to Fig. 8. Relays 81 to 88 in Fig. 8 are connected across leads 709 and 710, as are relays 89 to 95 in Fig. 9. Relays 81 to 95 inclusive, are of the tuned reed type. These relays 81 to 95 serve to detect two of the four signal frequencies from the mobile station and to translate them into two decimal digits representing the first two of a four digit number. Leads 709 and 710 also are connected to block 76 in Fig. 8 which represents another unit exactly like the rest of Fig. 8 except that the eight reed relays in block 76 are tuned to respond to different frequencies. Similarly, block 77 in Fig. 9 represents a circuit exactly like the main part of Fig. 9. The circuit in blocks 76 and 77 is used to detect the two signal frequencies representing the last two digits of a four digit number.

In order better to understand the operation of Figs. 8 and 9, let us assume that the operator has dialed the number 2973. As can be seen from the chart of Fig. 11 this number is represented by F2 and F7 of the first group of 15 frequencies and F7 and F13 of the second group of 15 frequencies.

It is to be understood that the fifteen frequency tones in the second group are entirely different from the fifteen tones of the first group, so that a total of thirty different frequencies are available. Thus the selected tones of the second group which we read off the chart of Fig. 11 as "F7 and F13" might be distinguished from the tones of the first group by considering the second pair as F7+15 and F13+15. For brevity of circuit description we here trace in detail the course of the first pair of selected tones only, it being understood that the remaining pair of tones follow similar courses through identical circuits contained in blocks 76 and 77 of Figs. 8 and 9 and 155 of Fig. 4. The first two of these frequencies, F2 and F7 applied to leads 709 and 710 will cause the second and seventh relays, 82 and 87 to vibrate. When relay 82 vibrates, ground is applied to lead 801 intermittently causing condenser 80 to discharge through resistance 79. When condenser 80 discharges sufficiently from its previous negative condition, vacuum tube 96 becomes conducting and causes relay 97, which is in its plate circuit, to operate. Relay 97 operated locks to a ground on lead 802 which is controlled by a normally closed contact on relay 29 in Fig. 7. Similarly, relay 87 causes vacuum tube 98 to become conducting and operate relay 99 which also locks to ground on lead 802. Similarly, in block 76 a relay equivalent to relay 99 will be operated while in block 77 of Fig. 9 the relay equivalent to relay 100 in Fig. 9 will be operated.

The lower contacts of the translating relays in Fig. 8 and Fig. 9 provide a network to indicate when exactly two relays are operated. In the example here illustrated ground is connected through a normally made contact of relay 130 in Fig. 8 to lead 816, through an operated contact of relay 97 to lead 817, through a normally closed contact of relay 131 to lead 805, through a normally closed contact of relay 132 to lead 806, through a normally closed contact of relay 133 to lead 807, through normally closed contact of relay 134 to lead 808, through an operated contact of relay 99 to lead 809, through a normally closed contact of relay 135 to lead 810, and thence to Fig. 9. In Fig. 9 lead 810 connects through a normally made contact of relay 136 to lead 901, through a normally made contact of relay 137 to lead 902, through a normally made contact of relay 138 to lead 903, through a normally made contact of relay 139 to lead 904, through a normally made contact of relay 100 to lead 905, through a normally made contact of relay 140 to lead 906, through a normally made contact of relay 141 to lead 907 and thence to Fig. 8. In Fig. 8 lead 907 is connected through a similar contact network in block 76 over lead 812 to block 77 in Fig. 9, through a similar contact network to lead 908 to block 76 in Fig. 8. In block 76, lead 908 connects to lead 811 which operates relay 142 in Fig. 7.

The operation of relay 142 connects ground to lead 726 thence through an operated contact of relay 17 to lead 727 and on to Fig. 4. For the first two digits of the number used in the present example, relays 144, 154 and 150 will be operated. Lead 727 is connected through a normally closed contact of relay 148 to lead 405, through an operated contact of relay 144 to lead 406, thence to Fig. 5 as lead 501, thence to Fig. 9 as lead 909, thence in Fig. 8 through an operated contact of relay 97 to lead 803, thence through an operated contact of relay 99 to lead 804, thence as lead 917 to Fig. 9, thence through a normally closed contact of relay 141 to lead 916, thence through a normally closed contact of relay 140 to lead 915, thence through a normally closed contact of relay 100 to lead 914, thence through a normally closed contact of relay 139 to lead 913, thence through a normally closed contact of relay 138 to lead 912, thence through a normally closed contact of relay 137 to lead 911, thence through a normally closed contact of relay 136 to lead 814 and back to Fig. 8. From lead 814 of Fig. 8 through a normally closed contact of relay 135 to lead 813, thence through an operated contact of relay 99 to lead 910 of Fig. 9, lead 502 of Fig. 5, and to lead 408 of Fig. 4. From lead 408 of Fig. 4 through an operated contact of relay 150 to lead 407, thence through an operated contact of relay 154 to lead 711. From lead 711 in Fig. 7 through an operated contact of relay 17 in Fig. 7 to lead 712, thence through an operated contact of relay 17 to lead 713 and back to block 155 in Fig. 4. In block 155 lead 713 is connected through a contact network on the tens register relays similar to the checking network already described for the thousandths register comprising relays 143 to 148. In a manner similar to that described above this lead is connected through the operated relays in the register circuit of block 155, thence through block 156 in Fig. 5 which is similar to one of the lamp blanks shown in the main part of Fig. 5 as 164 and 165, through the frequency translator for the tens unit in block 77 of Fig. 9 and block 76 of Fig. 8, back through block 157 in Fig. 5, thence through block 155 in Fig. 4, going out on lead 714 to Fig. 7. Lead 714 is connected through an operated contact of relay 17 of Fig. 7 to lead 715 to operate relay 28. The operation of relay 28 connects ground to lead 724 causing lamp 166 to light as an indication to the operator that the called station has been reached. The operation of relay 28 also connects the output of the check tone oscillator block 158 over leads 716 and 717 to leads 703 and 704 which are connected through normally closed contacts of relay 29 to leads 705 and 706 leading to transmitter 27. The check tone oscillator 158 may be any type of signal generator, of which many types are well known to the art.

The demodulated output of radio receiver 30 in Fig. 10, comprising the received check tone, is connected from lead 1001 through an operated contact of relay 31 to lead 1029 thence through the wave filter 73, which is a narrow band filter of any type common to the art, thereby passing the check tone over lead 1030 to rectifier 74 which is poled in a direction to pass positive voltage peaks only. The rectified output from rectifier 74 is connected over lead 1031 through an operated contact of relay 31 to lead 1018 and thence to a grid of tube 50. The network consisting of resistance 48 and capacitance 49 smooths the output of the rectifier and maintains a steady voltage on the grid of tube 50.

When relay 31 first operated as described above, it removed the positive potential from the grid of vacuum tube 50, cutting off its plate current and causing relay 54 to release. Relay 54, released, connected ground to lead 1032, thence through an operated contact of relay 31 over lead 1033 to operate relay 55. Relay 55 in operating connected ground to lead 1032 to hold itself operated under control of relay 31. When relay 54 reoperates as a result of the received check tone it connects ground to lead 1019 thence through an operated contact of relay 55 and lead 1034 to operate relay 56. Thus it will be apparent that the second successive operation of relay 54, under these circumstances, conditions the mobile station to respond to a ringing signal. The operation of relay 56:

*a.* Substitutes a controlled ground on lead 1035 from an operated contact on relay 54 for the locking ground for relay 31.

*b.* Locks itself over lead 1036 to ground through an operated contact of relay 31.

*c.* Applies a ground to lead 1037 through a normally closed switchhook contact over lead 1038 to operate the call bell 1043 and the call lamp 1044 through lock-up relay 1045.

If the mobile subscriber is not in attendance at his mobile station when an incoming call is received, the call lamp 1044 remains operated through the lock-up device 1045 to indicate to him that a call was received during his absence. As has been described above, the land station operator has already received positive indication that the mobile station was signalled regardless of whether the mobile subscriber is in attendance at his mobile station when the call is made. The indicating call lamp 1044 at the mobile station may be extinguished by the mobile subscriber at any time by operation of push button 1046, or it may also be controlled by a switchhook contact so as to be extinguished when the subscriber lifts his handset from the cradle.

Assuming that the mobile subscriber is present to answer the incoming call, when the subscriber lifts his handset from the cradle, the switchhook 167 operates, connecting ground to lead 1039 through an operated contact of relay 56 to operate relay 34. The operation of relay 34 removes ground from lead 1021 releasing relay 31. The release of relay 31 removes the reed relays 35, 36, 37 and 38 from the oscillator circuit. The release of relay 31 releases relay 55, and also removes the output of audio amplifier 32 from rectifier 74 thereby cutting off the plate current of vacuum tube 50 and releasing relay 54. Operation of relay 34 further connects the output of the audio amplifier 32 to the receiver of the subscriber's handset over lead 1040. It also connects the subscriber's microphone over lead 1041 through an operated contact of relay 34 over lead 1027 to the modulator 59. Relay 34 remains locked up over lead 1042 through the operated contact of relay 34 over lead 1039 to ground on the operated switchhook contact. The operation of the switchhook 167 also silences the bell by interrupting the circuit between 1037 and 1038. The mobile station is now in the talking condition with all signalling equipment released.

When the operator is satisfied that the call has been established, as shown by the operation of a lamp at her switchboard, she releases key 16 and operates key 159 which connects ground to lead 716 operating relay 29. The operation of relay 29 connects leads 705 and 706 to the hybrid coil 161 over leads 718 and 728. The output of the hybrid coil is connected through the line jack 160. The operation of relay 29 also connects the radio receiver over leads 707 and 708 through operated contacts of relay 29, via leads 719 and 720 to the hybrid coil 161, thus establishing a talking path at the land station. The operation of relay 29 removes ground from lead 802 causing the release of all previously operated relays in Figs. 8 and 9.

Figure 2:
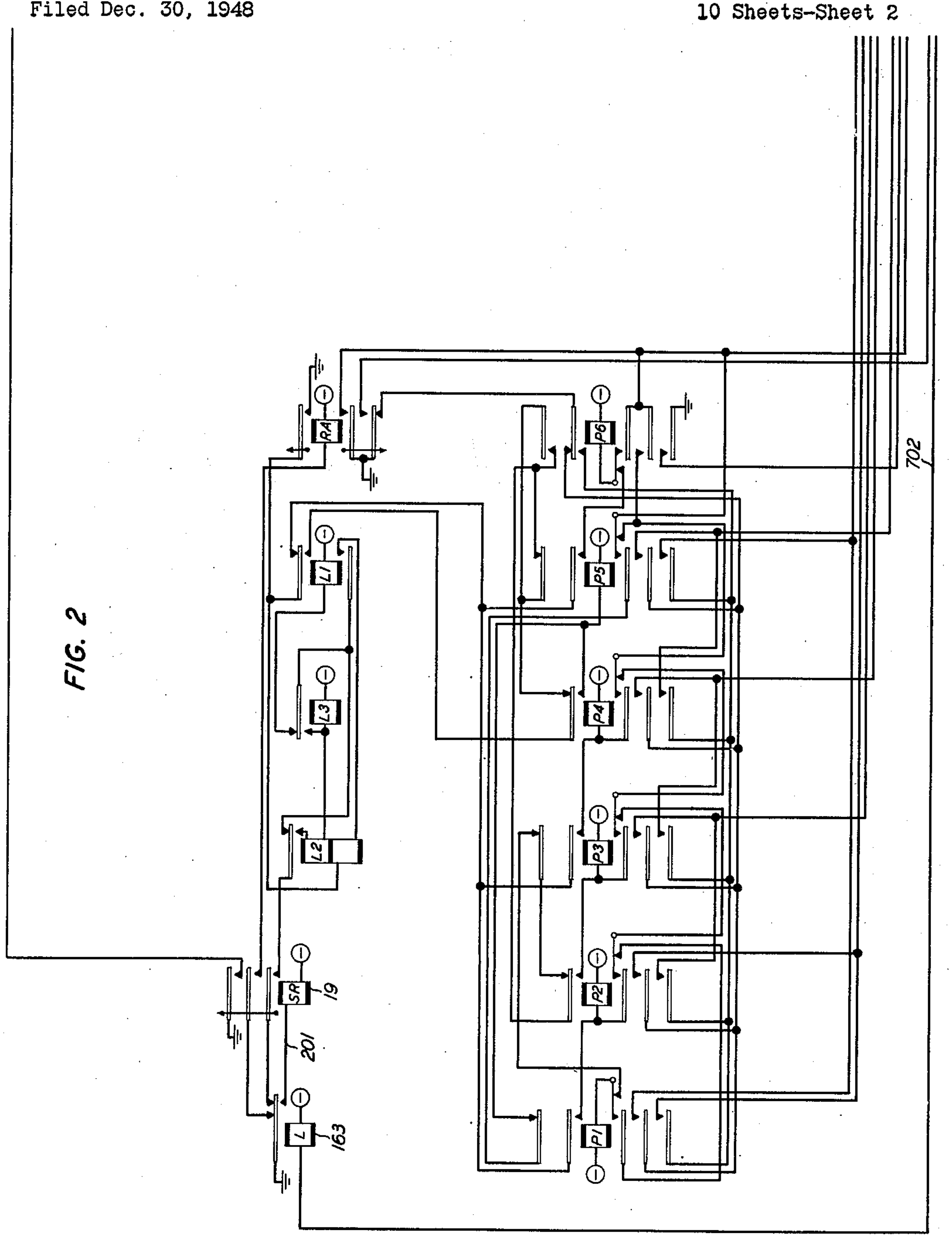
Fig. 2 illustrates schematically a pulse counting circuit for counting successive electrical impulses comprising dialed digits of a call number.
Figure 3:
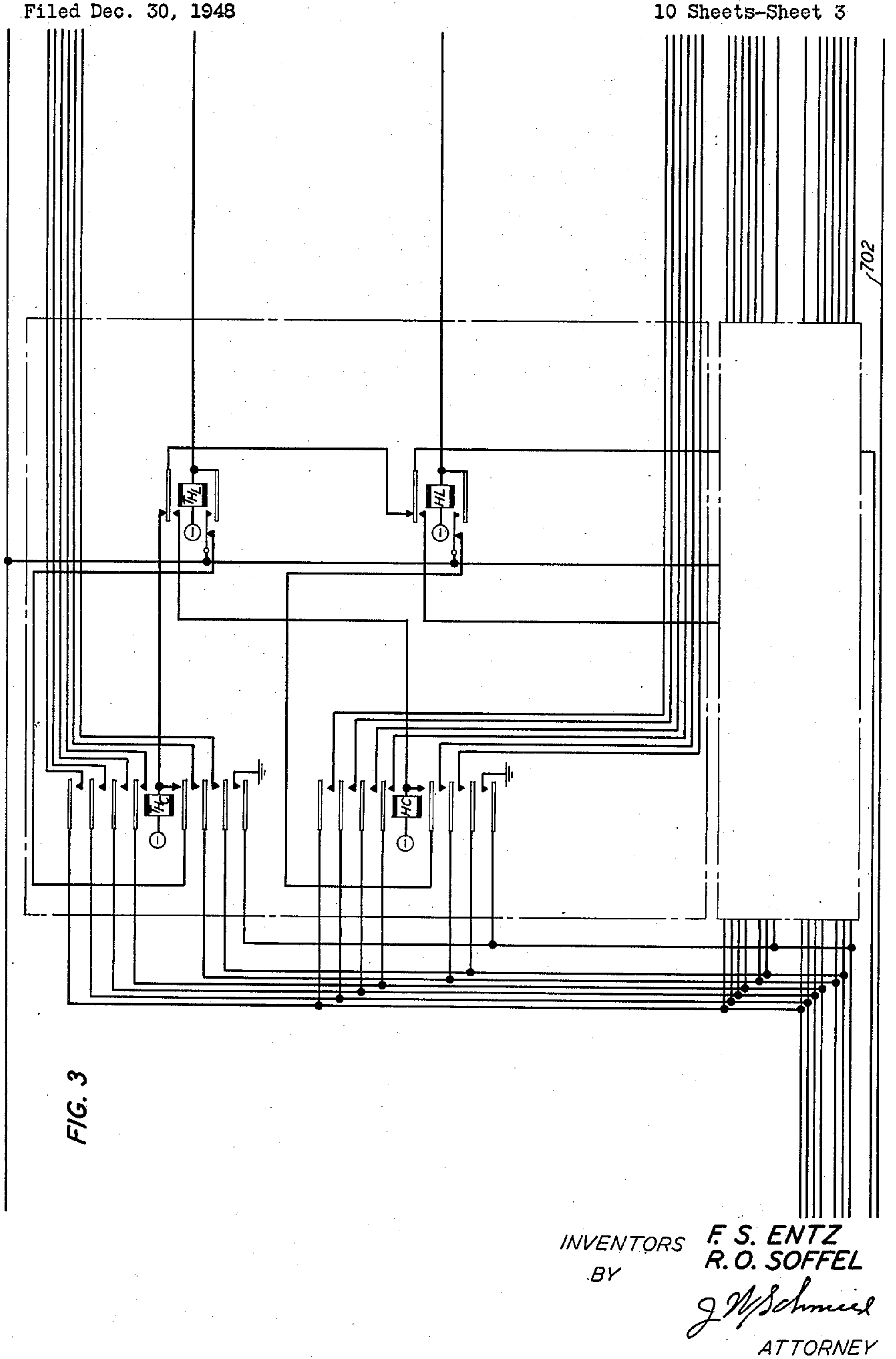
Fig. 3 illustrates a steering circuit for directing successively dialed digits into different portions of a telephone register.

When the operator releases key 16 breaking the connection between the dial 18 and relay 163 in Fig. 2, the latter releases causing the release of slow release relay 19. The release of relay 19 releases all operated relays in Figs. 2, 3 and 4. At the end of the call the operator releases key 159 releasing relay 29 in Fig. 7 which releases all equipment in the land station, restoring idle condition preparatory to the placing of another call. The mobile subscriber when he hangs up at the end of the call releases all relays in the mobile station which is then in condition to receive or initiate a new call.

The case where a call is originated by a mobile station will now be described.

When the subscriber removes his handset from the switchhook 167, ground is connected through an operated contact of the switchhook 167 to lead 1020 through a normally closed contact of relay 34 over lead 1021 to operate relay 31. The operation of relay 31 as previously described sets up the tuned reed relays 35—38 and the audio amplifier 32 as a four tone oscillator. The operation of relay 31 connects ground from a normally closed contact of relay 54 and lead 1032 through an operated contact of relay 31 to lead 1033, to operate relay 55. The operation of relay 31 also energizes the mobile radio transmitter 58 over lead 1024. The four frequencies from the mobile station tuned reed oscillator are thus transmitted as previously described. This signal comprising in combination four distinctive tones from the mobile station is received and demodulated by the land station radio receiver 75 in Fig. 7. The output of receiver 75 is connected over leads 707 and 708 through normally closed contacts of relay 29 to leads 709 and 710 and thence to the frequency translator in Figs. 8 and 9. As previously described, these four signal frequencies will cause the operation of two of the translating relays in Fig. 8 and Fig. 9 and two of the relays in block 76 of Fig. 8 and block 77 of Fig. 9. When four relays are operated, ground is connected to lead 811 as previously described, thereby operating relay 142 in Fig. 7. The operation of relay 142 connects ground from the normally closed contact of relay 17 to lead 722 through an operated contact of relay 142 over lead 721 to light lamp 163 indicating to the operator that a mobile station has originated a call. In this case of a call originating from a mobile station, relay 17 of Fig. 7 does not operate, as previously, and therefore ground is connected through normally closed contacts on this relay to leads 804 and 815. Ground on lead 804 from Fig. 7 goes through the contact network on relays in Figs. 8 and 9. Assuming the same number used previously, that is, 2973, ground is connected from lead 804 through an operated contact of relay 99 in Fig. 8 to lead 803, thence through an operated contact of relay 97 to lead 909, thence to Fig. 9, thence becoming lead 501 in Fig. 5 to light lamp 164 of Fig. 5 thereby indicating the thousands digit. Ground on lead 804 from Fig. 8 is connected to lead 917 in Fig. 9 through a normally closed contact on relay 141 to lead 916, thence through a normally closed contact on relay 140 to lead 915, thence through a normally closed contact on relay 100 to lead 914, thence through a normally closed contact on relay 139 to lead 913, thence through a normally closed contact on relay 138 to lead 912, thence through a normally closed contact on relay 137 to lead 911, thence through a normally closed contact on relay 136 to lead 814 and back to Fig. 8, thence through a normally closed contact on relay 135 to lead 813, thence through an operated contact on relay 99 to lead 910 and back again to Fig. 9.

Figures 5, 6:
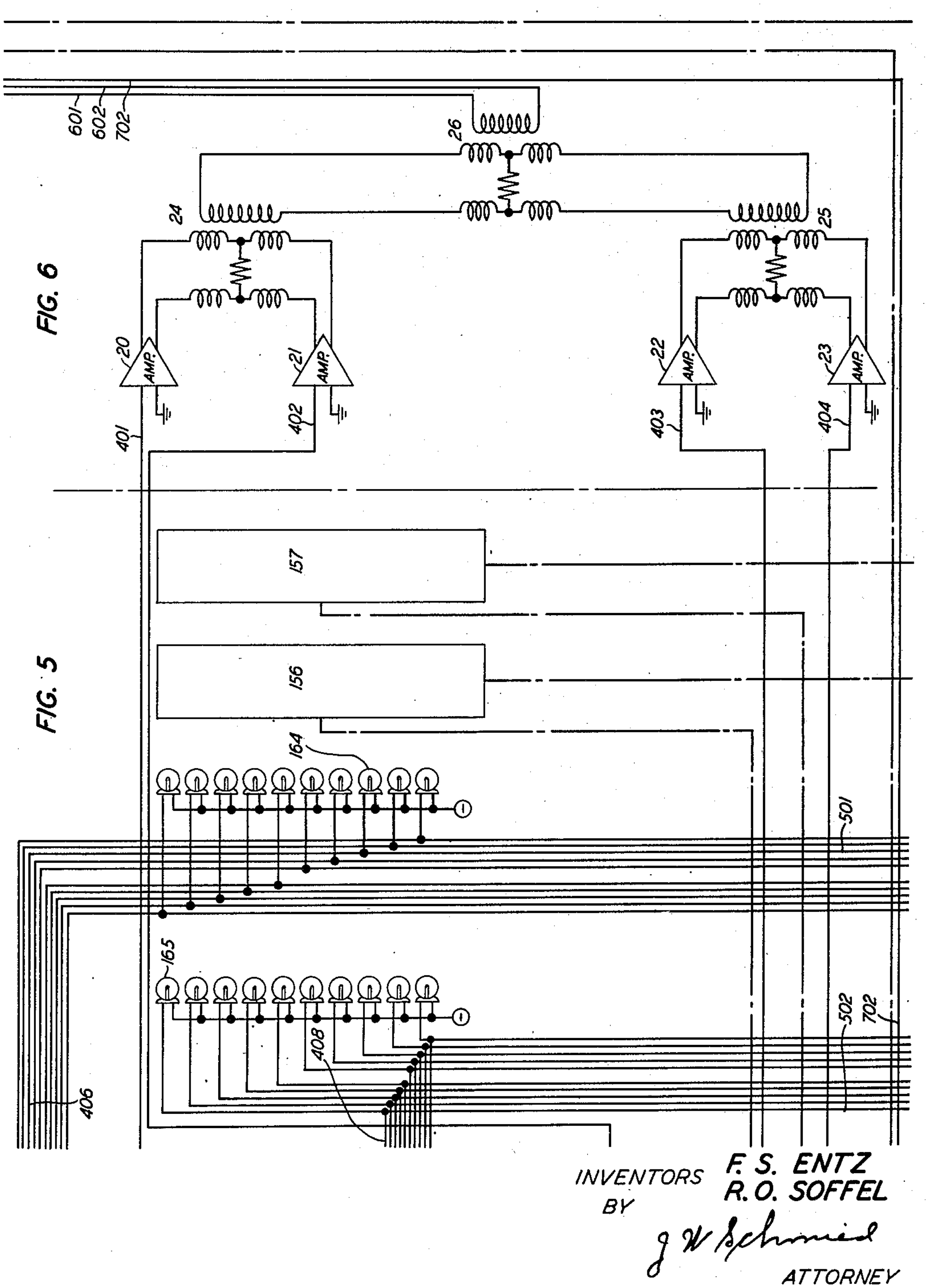
Fig. 5 illustrates a display circuit to indicate which signal currents are selected by the register translator of Fig. 4, and also to identify a mobile station originating a call.
Fig. 6 illustrates a combiner circuit for combining the selected plurality of different frequency signal currents into a unitary station calling signal.

In Fig. 9 lead 910 connects to lead 502 of Fig. 5, thereby lighting lamp 165 to indicate the hundreds digit. Similarly the proper lamps for indicating the tens and units digits are lit by operation of corresponding relays in blocks 76 and 77 of Figs. 8 and 9. When relay 142 in Fig. 7 operated, it connected ground from lead 723 via a normally closed contact on relay 17 through an operated contact on relay 142 to lead 715, thereby operating relay 28. The operation of relay 28 as previously described connects the output of the check tone oscillator 158 to the radio transmitter through normally closed contacts on relay 29. The check tone when received at the mobile station in Fig. 10 again passes through filter 73 and rectifier 74 to cause vacuum tube 50 to draw plate current, thereby operating relay 54. In a manner similar to that previously described, the operation of relay 54 causes the operation of the call relay 56.

The operation of relay 56 in turn operates relay 34 as previously described. The operation of relay 34 causes the release of relay 31. With relay 34 operated and relay 31 released, the mobile station is set in the talking condition.

When the operator has recorded the number of the calling mobile station as indicated by operation of the identifying display lamps at her switchboard, she operates key 159, thereby operating relay 29 in Fig. 7. The operation of relay 29 in Fig. 7 releases the locked up relays in Figs. 8 and 9 causing the display lamps in Fig. 5 to be extinguished. Disconnection at the end of the call is accomplished in the same manner as in the case of a land station originated call described above.

What is claimed is:

1. In a bidirectional radio telephone multi-party selective signalling system, a party identification arrangement comprising a distinctive combination of tuned signal generators at each party station, means for simultaneously energizing a plurality of said signal generators at any party station, and receiving means at a calling station responsive to signals from said energized generators at any party station, said receiving means adapted to identify selectively any party station in accordance with the distinctive combination of signals received therefrom.

2. In a bidirectional radio telephone multiparty station signalling system, a party identification arrangement comprising a distinctive combination of tuned signal generators at each party station, means at any party station for simultaneously energizing said signal generators thereat, and receiving means at a calling station responsive to signals from said energized generators at any party station, said receiving means adapted to identify said party station selectively in accordance with the distinctive combination of signals received therefrom.

3. In a bidirectional radio telephone multiparty station signaling system, a party identification arrangement comprising a distinctive combination of tuned signal generators at each party station, means at a calling station for energizing all of said signal generators at any party station simultaneously, and receiving means at said calling station responsive to signals from said simultaneously energized signal generators, said receiving means adapted to identify any party station in accordance with the distinctive combination of signals received therefrom.

4. In a multiparty station signalling system, a calling station and a plurality of outlying stations interconnected with each other and with said calling station by a common transmission medium, said outlying stations each comprising a plurality of tuned elements adapted to be energized by a particular combination of signals in accordance with a predetermined code and not to be energized by any other combination, means at said calling station for generating simultaneously a plurality of distinctive signals in any desired combination, means including said plurality of tuned elements at each outlying station controlled by reception thereat of a particular combination of simultaneous signals corresponding to the code of said station for generating a plurality of simultaneous signals distinctive to said outlying station, further means at each outlying station for transmitting said generated plurality of distinctive signals to said calling station, receiving means at said calling station responsive to said transmitted signals from said outlying station, and further means at said calling station adapted to identify said outlying station by the distinctive combination of signals received therefrom.

5. In a multiparty station signaling system, a common transmission medium, a calling station and a plurality of outlying stations interconnected with said calling station by said transmission medium, each of said outlying stations comprising a plurality of tuned relays, adapted to be operated by a distinctive combination of signaling tones in accordance with a predetermined code, means at said calling station for simultaneously generating a plurality of distinctive signal tones in any desired combination, means including said tuned relays at each outlying station controlled by simultaneous reception thereat of a particular combination of signaling tones corresponding to the code of said station for generating simultaneously a plurality of signal tones distinctive to said outlying station, further means at each outlying station for transmitting said simultaneously generated plurality of distinctive signal tones to said calling station, receiving means at said calling station responsive to said transmitted signal tones from said outlying station, and further means at said calling station adapted to identify said outlying station by the distinctive combination of signal tones received therefrom.

6. In a signaling system, a calling station and a plurality of outlying stations interconnected therewith by a common transmission medium, means at said calling station for generating a plurality of digital impulses corresponding to digits of a call number, means for registering all the digits of said call number, a plurality of signaling tones of distinctive frequencies, a translator controlled by said registering means for selecting a distinctive combination of said signaling tones corresponding to the particular call number registered, means for transmitting said selected combination of signal tones from said calling station, means at said outlying stations for receiving said signal tones, selective means at each outlying station responsive to a particular combination of tones received in accordance with a predetermined code for each station, said selective means adapted to generate a distinctive combination of identifying signal tones at any called outlying station, means at said called station for transmitting said distinctive combination of identifying signal tones therefrom, selective means at said calling station for receiving said transmitted signal tones from said called outlying station, means at said calling station for comparing the signal tones received thereat with the signal tones transmitted therefrom, further means at said calling station operable only upon correct comparison of said signaling tones to interrupt transmission of signal tones therefrom and to establish a talking condition, and means at said called outlying station responsive to interruption of said signaling tones to establish talking condition thereat.

7. In a signaling system, a calling station and a plurality of outlying stations interconnected therewith by a common transmission medium, means at said calling station for registering the digits of a call number, a plurality of signaling tones of distinctive frequencies, a translator controlled by said registering means for selecting a combination of said signaling tones corresponding to the particular call number registered, means for transmitting said selected combination of signal tones simultaneously from said calling station, means at said outlying stations for receiving said simultaneous signal tones, selective means at each outlying station responsive to a particular combination of simultaneous tones in accordance with a predetermined code for each station, said selective means adapted to retransmit a distinctive combination of identifying signal tones from said called station, means at said calling station for receiving said retransmitted signal tones from said called outlying stations, a plurality of selective means at said calling station for registering said received signal tones from said outlying stations, means at said calling station for comparing said registered signal tones received thereat with the signal tones transmitted therefrom, further means at said calling station operable only upon correct comparison of said signaling tones to interrupt transmission of signal tones therefrom and to establish transmission of ringing tone, means at said called outlying station responsive to said ringing tone to interrupt transmission of said identifying signal tones therefrom and to establish a talking condition thereat, and means at said calling station to interrupt said ringing tone and establish a talking condition.

8. In a multiparty station signaling system, the method of selective signaling comprising the steps of transmitting a distinctive combination of signal tones from a calling station, receiving said signal tones at a called station, retransmitting said signal tones from said called station to said calling station, receiving said retransmitted signal tones from said called station at said calling station, comparing said retransmitted signal tones from said called station with said originally transmitted signal tones from said calling station, and establishing a talking condition between said calling station and said called station only upon exact comparison of said retransmitted signal tones with said originally transmitted signal tones.

9. In a multistation selective signaling system, a plurality of outlying stations capable of being called, a calling station, a channel of transmission at least in part connecting said calling station with each of said plurality of stations, each of said plurality of stations being provided with a plurality of resonantly responsive devices selectively operable by alternating current of characteristic individually unique for each outlying station, means including an emitter at the calling station emissive of current of said unique characteristic of one out of said outlying stations to be called, means controlled by said resonantly responsive devices upon their selective response at one of said outlying stations to said current, generating means at said one station, means whereby said generating means is caused to emit to said calling station current of characteristic uniquely determined for said one station with respect to each and every of said stations, interconnections whereby said resonantly responsive devices determine said characteristic, and means selectively responsive to verify at said calling station the receipt of current having the characteristic individual to said one station to be called.

10. In a multistation selective signaling system, a calling station, a plurality of stations capable of being called selectively, means for emitting from the calling station toward said plurality of stations current having a combination of frequency components individual to each station to be called, selectively responsive resonant responders at each station responsive only to the combination individual to that station, and current emitters controlled by selective response of said responders for emitting current of the frequency components which caused response of said responders toward and to said calling station.

11. In a multistation selective signaling system, a calling station, a plurality of stations capable of being called selectively, means for emitting from the calling station toward said plurality of stations current having a combination of frequency components individual to each station to be called, selectively responsive resonant responders at each station responsive only to the combination individual to that station, current emitters at said stations controlled by selective response of said responders for emitting current of the frequency components which caused response of said responders toward and to said calling station, comparison means at said calling station for comparing the combination of frequency components of the received current with the frequency components of said current emitted from said calling station, and a checker operable in different ways according to the determination of identity or lack of identity by said comparison means.

12. In a multistation selective signaling system, a calling station, a plurality of stations capable of being called selectively, means for emitting from the calling station toward said plurality of stations current having a combination of frequency components individual to each station to be called, selectively responsive resonant responders at each station responsive only to the combination individual to that station, current emitters at each station controlled by selective response of said responders for emitting current of the frequency components which caused response of said responders toward and to said calling station, comparison means at said calling station for comparing the combination of frequency components of the received current with the frequency components of said current emitted from said calling station, a checker operable in different ways according to the determination of identity or lack of identity by said comparison means, and a verification current transmitter responsive to determination of identity by said checker for sending a verification current to said outlying station which emitted the incoming current to be checked, and a call device at said outlying station responsive to said verification current for establishing a calling condition thereat.

13. In a multistation selective signaling system, a calling station, a plurality of stations capable of being called selectively, means for emitting from the calling station toward said plurality of stations current having a combination of frequency components individual to each station to be called, selectively responsive resonant responders at each station responsive only to the combination individual to that station, means controlled by response of said resonant responders to condition said station for receiving a verification signal, current emitters at each station controlled by selective response of said responders for emitting current of the frequency components which caused response of said responders toward and to said calling station, comparison means at said calling station for comparing the combination of frequency components of the current received thereat with the frequency components of said current emitted from said calling station, a checker operable in different ways according to the determination of identity or lack of identity by said comparison means, and a verification signal transmitter responsive to determination of identity by said checker for sending a verification current to said outlying station which emitted the incoming current to be checked, and a call device at said outlying station responsive to said verification current for establishing a calling condition thereat.

14. A station identifying arrangement for signaling systems comprising a calling station and a plurality of outlying stations, said outlying stations each comprising a distinctive plurality of differently tuned receiving means, separate means controlled by simultaneous operation of all of said receiving means at an outlying station to establish a calling condition, means at a calling station for selecting a simultaneous plurality of calling signals corresponding in frequencies to the individual tunings of said plurality of tuned receiving means at an outlying station to be called, means for causing the simultaneous transmission of said selected calling signals to all of said outlying stations, means at one of said outlying stations including said distinctive plurality of differently tuned receiving means responsive to said calling signals to establish a calling condition at said station, means for causing return transmission of a corresponding simultaneous plurality of signals from said called outlying station to said calling station upon reception of said calling signals at said outlying station, receiving means at said calling station responsive to said return signals from said outlying station, and means for identifying said outlying station thereby.

15. A signaling system including a calling station and a plurality of outlying stations each comprising a distinctive plurality of individually tuned elements adapted to be actuated by electrical waves of frequencies corresponding to their respective tunings and not to be actuated by waves of any other frequencies, means at a calling station for generating simultaneously a plurality of electrical waves corresponding in frequencies to the respective tunings of elements at an outlying station, means for causing the transmission of said waves to and their reception at an outlying station, means at said outlying station controlled by the actuation of distinctively tuned elements thereat to return a distinctive signal from said outlying station to said calling station, and indicating means at said calling station responsive to said returned distinctive signal to identify said outlying station.

16. A signaling system including a calling station and a plurality of outlying stations each comprising a differently tuned selector adapted to be operated by a simultaneous combination of electrical currents of distinctive frequencies and not to be operated by any other combination, means at a calling station for selecting and simultaneously combining a plurality of calling currents of frequencies distinctive to the tuned selector at any outlying station to be called, transmitting means at said calling station, a transmission medium connecting said calling station with said plurality of outlying stations, receiving means at each of said outlying stations, further transmitting means at each outlying station in combination with said selector means thereat for transmitting a distinctive return signal therefrom upon the reception of a distinctive call signal to operate said selector means thereat, means at said calling station for receiving said distinctive return signal as transmitted from said outlying station, and indicating means at said calling station controlled by reception thereat of said return signal from said outlying station to indicate that said outlying station has been signaled.

17. In a multiparty station signaling system, a calling station and a plurality of outlying stations interconnected therewith by a common transmission medium, said outlying stations each comprising a plurality of tuned vibrator elements in combination with means for vibrating said elements when said means are energized by a plurality of distinctive signals of frequencies corresponding to the vibratory period of said elements, means at said outlying stations including said vibrator elements for generating a distinctive combination of signal tones when said elements are vibrated, means at said calling station for transmitting simultaneously a distinctive plurality of calling signals selected in accordance with an assigned code to call any of said outlying stations, selective receiving means at an outlying station including tuned vibrator elements adapted to be vibrated by reception of said selected combination of signals from said calling station, means at said outlying station operable incident to the simultaneous vibration of said vibrator elements to generate said distinctive combination of signal tones thereat, means for transmitting said generated signal tones from said outlying station to said calling station, means at said calling station for receiving said transmitted signal tones from said outlying station, means at said calling station for comparing said received signal tones from said outlying station with said calling signals transmitted from said calling station to said outlying station, further means at said calling station operable by comparison of said received signal tones and said transmitted calling signals to interrupt said transmitted calling signals from said calling station and to impress on the transmitting means thereof a distinctive ringing signal, and means at said called outlying station responsive to said ringing signal to effect a calling indication thereat.

FERDINAND S. ENTZ.
ROBERT O. SOFFEL.

REFERENCES CITED

The following references are of record in the file of this patent:

UNITED STATES PATENTS

| Number | Name | Date |
|---|---|---|
| 1,196,761 | Clausen | Sept. 5, 1916 |
| 1,532,207 | Stacy | Apr. 7, 1925 |
| 1,608,520 | O'Neill | Nov. 30, 1926 |
| 2,052,581 | Richards | Sept. 1, 1936 |
| 2,057,541 | Shepherd | Oct. 13, 1936 |
| 2,057,656 | Bauer | Oct. 20, 1936 |
| 2,139,352 | Boswau | Dec. 6, 1938 |
| 2,168,602 | Hassan | Aug. 8, 1939 |
| 2,188,520 | Wochinger | Jan. 30, 1940 |
| 2,206,538 | Rhodes | July 2, 1940 |
| 2,232,866 | Pruden | Feb. 25, 1941 |
| 2,315,798 | Leibe | Mar. 30, 1943 |
| 2,340,798 | Deal | Feb. 1, 1944 |
| 2,393,291 | Clark | Jan. 22, 1946 |
| 2,444,452 | Labin | July 6, 1948 |

FOREIGN PATENTS

| Number | Country | Date |
|---|---|---|
| 516,615 | Great Britain | Jan. 8, 1940 |

OTHER REFERENCES

AIEE Technical Paper 49–100, December 1948.